United States Patent [19]

Miller et al.

[11] Patent Number: 5,376,749
[45] Date of Patent: Dec. 27, 1994

[54] STABILIZED AMMONIUM POLYSULFIDE SOLUTIONS AND PROCESS UTILIZING SAME

[75] Inventors: Richard F. Miller; Eugene H. Morselander, both of Humble, Tex.

[73] Assignee: The Western Company of North America, Houston, Tex.

[21] Appl. No.: 131,720

[22] Filed: Oct. 5, 1993

[51] Int. Cl.$^5$ .......................... C01B 17/34; C01C 1/20
[52] U.S. Cl. ..................... 588/246; 210/904; 252/188.2; 423/266; 423/562; 588/901
[58] Field of Search ............... 423/562, 266, 267, 268; 252/188.2; 588/246; 210/904

[56] References Cited

U.S. PATENT DOCUMENTS

| | | | |
|---|---|---|---|
| 2,403,939 | 7/1946 | MacIntire | 423/562 |
| 2,722,473 | 3/1955 | Toland, Jr. | 423/562 |
| 3,840,644 | 10/1974 | Leigh | 252/188.24 |
| 3,876,756 | 4/1975 | Romantschuk et al. | 423/562 |
| 4,508,683 | 4/1985 | Doll et al. | 210/904 |
| 4,624,837 | 11/1986 | Baker | 588/246 |
| 4,693,873 | 9/1987 | Baker | 588/246 |
| 4,737,289 | 4/1988 | Castaldi et al. | 210/907 |
| 4,790,940 | 12/1988 | Castaldi et al. | 210/907 |
| 5,173,306 | 12/1992 | Green, II et al. | 423/266 |

FOREIGN PATENT DOCUMENTS 91-00246 1/1991 WIPO .................. 588/246

OTHER PUBLICATIONS

Journal of Chemical Education, 1929, pp. 2203–2208, The Preparation and Standardization of Ammonium Polysulfide and its Action on Some Group II Sulfides.

*Primary Examiner*—Gary P. Straub
*Attorney, Agent, or Firm*—C. James Bushman; Peter A. Bielinski

[57] ABSTRACT

A stabilized ammonium polysulfide solution comprising an aqueous solution of ammonium polysulfide and a stabilizing amount of a water soluble, stabilizing compound that can be an azacyclic compound, a compound having the formula $R-O-(C_nH_{2n})NH_2$ or a compound having the formula $(CH_3)_2NR_1$, the pH of the composition being from 7 to 14, the stabilized composition being useful in controlling the cyanide concentration in aqueous streams.

11 Claims, No Drawings

STABILIZED AMMONIUM POLYSULFIDE SOLUTIONS AND PROCESS UTILIZING SAME

BACKGROUND OF THE INVENTION

1. Field of the Invention

The present invention relates to the stabilization of ammonium polysulfide solutions and to a process for controlling cyanides in water streams using such stabilized ammonium polysulfide solutions.

2. Description of the Prior Art

Cyanides are found in numerous industrial streams such as, for example, aqueous waste streams in refineries, chemical plants and the like. The cyanides cause considerable corrosion, hydrogen blistering and waste water treatment problems.

It is known, as a method of controlling cyanides in such waste water streams, to add polysulfides such as sodium and ammonium polysulfides into the waste water system. The polysulfides convert the cyanides into noncorrosive, biodegradable thiocyanates, which are water soluble and can be readily removed by stripping.

Ammonium polysulfide is known only in solution and is generally obtained by passing hydrogen sulfide into a 28% ammonium hydroxide solution and dissolving an excess of sulfur in the resulting solution. Over time, and under typical storage conditions, the ammonium polysulfide decomposes, resulting in the precipitation of free sulfur. The resulting ammonium polysulfide solution containing the precipitated sulfur is largely unfit for use in the control of cyanides because of the fact that the active ingredient is no longer present. Further, the precipitated sulfur can clog valves, pumps and lines, leading to expensive downtime. Since it is typical. e.g., in a refinery operation, for the ammonium polysulfide solution that is used for the control of cyanides to be in storage for relatively long periods of time, a method is needed that will enhance the stability of the ammonium polysulfide without deleteriously affecting its cyanide control capabilities.

SUMMARY OF THE INVENTION

It is therefore an object of the present invention to provide a method for stabilizing ammonium polysulfide solutions.

Another object of the present invention is to provide a stabilized ammonium polysulfide solution.

Still a further object of the present invention is to provide an ammonium polysulfide solution that is stable at sub-ambient temperature conditions.

Yet a further object of the present invention is to provide a method of controlling the cyanide concentration in an aqueous stream using a stabilized ammonium polysulfide solution.

The above and other objects of the present invention will become apparent from the description given herein and the appended claims.

In one aspect, the present invention provides a method of stabilizing an ammonium polysulfide solution in which a stabilizing amount of a water soluble stabilizing compound selected from the group consisting of azacyclic compounds, compounds having the formula R—O—$C_nH_{2n}NH_2$, wherein R is an alkyl group of from 1 to 3 carbon atoms and n is 1 to 3, compounds having the formula $(CH_3)_2NR_1$, wherein $R_1$ is a hydrocarbon group having from 1 to 6 carbon atoms and mixtures thereof is added to an ammonium polysulfide solution, the pH of the stabilized solution being in the range of from about 7 to about 14.

Another aspect of the present invention is a stabilized composition comprising an aqueous solution of ammonium polysulfide containing a stabilizing amount of a stabilizing compound as described above, the pH of the composition being from about 7 to about 14.

The present invention also contemplates a method for controlling the concentration of cyanides in an aqueous stream comprising injecting into the stream an effective amount of a stabilized aqueous ammonium polysulfide solution containing a stabilizing amount of a stabilizing compound, as described above, the pH of said ammonium polysulfide solution being in the range of from 7 to 14.

DESCRIPTION OF THE PREFERRED EMBODIMENTS

The ammonium polysulfide solution (APS) used in the composition and methods of the present invention is an aqueous ammonium sulfide solution (usually available in concentrations of up to 70% by weight) containing net-free sulfur available for complexing weight simple cyanides. The net-free sulfur is the sulfur that dissociates from the ammonia complex and reacts with cyanides to form the desired thiocyanates. The ammonium polysulfide has the general formula:

$$(NH_4)_2S_x$$

wherein x is an integer from 2 to 8.

According to the process of the present invention, APS can be stabilized by the addition of a stabilizing amount of certain amine-type compounds that are water soluble (soluble in the APS), do not deleteriously affect the reaction of the ammonium polysulfide with cyanides, and prevent decomposition of the ammonium polysulfide at ambient temperature (approximately 20°–30° C.), at sub-ambient temperature (less than about 15° F.), or both. The useful stabilizing compounds are azacyclic compounds, compounds having the formula:

$$R—O—C_nH_{2n}NH_2$$

wherein R is an alkyl group of from 1 to 3 carbon atoms and n is 1 to 3, compounds having the formula $(CH_3)_2NR_1$, wherein $R_1$ is a hydrocarbon group having from 1 to 6 carbon atoms.and mixtures of such compounds. Thus, $R_1$ can be methyl, ethyl, butyl, cyclohexyl, etc. Non-limiting examples of azacyclic compounds include morpholine, pyrrolidine, ethylenimine, quinuclidine, pyrroline, pyrrole, N-methyl pyrrolidone (NMP), 2-pyrrolidinone and the like. Particularly preferred are azacyclic compounds wherein the nitrogen is present as a secondary amine. Especially preferred as an azacyclic stabilizing compound is morpholine. Non-limiting examples of compounds having the formula R—O—$C_nH_{2n}NH_2$ that are useful include 3-methoxypropylamine, ethoxyethylamine, methoxyethylamine, etc. Non-limiting examples of compounds having the formula $(CH_3)_2NR_1$, that are useful include dimethylcyclohexylamine.

The amount of the stabilizing agent added will depend upon the length of storage of the APS, the temperature conditions under which the storage occurs, the type of storage utilized for the APS, the type of stabilizing compound used, etc. For example, some stabilizing compositions are effective at ambient temperatures, but not at sub-ambient temperatures of less than about 15° F. In general, the stabilizing compound is added in a stabilizing amount, i.e., an amount that significantly reduces the precipitation of free sulfur from the APS during storage or use. More specifically, a stabilizing amount of the stabilizing compound is that amount that prevents significant crystallization and precipitation of free sulfur either at ambient temperature, especially when ammonia is being or has been lost from the APS, or that prevents such crystallization and precipitation at sub-ambient temperatures of less than about 15° F., especially less than about 10° F. For example, it is desired that the APS remain stable for at least about 30 days without significant precipitation of sulfur. Most desirably, it is desired that the APS remain stable at ambient temperature for at least 45 days, especially at least about 75 days, without significant precipitation of sulfur. While an effective or stabilizing amount of the stabilizing compound can be readily determined by those skilled in the art, generally speaking the stabilizing compound will be present in an amount of from about 3 to about 15% by weight of the composition, i.e., the amount of stabilizing compound and APS. and APS.

The stabilized APS can be prepared by mixing in any suitable fashion the APS and the water soluble stabilizing compound.

The stabilized APS composition prepared according to the process of the present invention will have a pH of greater than 7, up to 14, more preferably from about 8 to about 12. It will be appreciated that acidic pHs are to be avoided since this results in rather rapid decomposition of the ammonium polysulfide. It is particularly desirable that the pH be maintained between about 8 and 12 since this results in optimum stability of the APS without introducing an excessively alkaline solution in waste (aqueous) streams being treated.

The destabilization of APS solution, as noted above, is evidenced by the precipitation of sulfur. This can occur due to loss of ammonia from evaporation during manufacture, transportation and/or storage. Furthermore, low temperatures, e.g., about 15° F. and lower, especially 10° F. and lower, result in precipitation of the sulfur, thereby depleting the active cyanide-removing agent. Moreover, as noted above, the presence of precipitated sulfur can lead to plugging of lines, pumps, filters, etc., which is clearly undesirable.

The stabilized APS composition of the present invention can be effectively used in methods of controlling cyanides in aqueous streams such as, for example, the water system of an FCC reactor such as taught in U.S. Pat. No. 4,508,683, which is incorporated herein by reference for all purposes. In such water streams or systems, the stabilized APS of the present invention is injected into the system at the desired location, which can be readily determined by those of skill in the art, the amount of APS solution being injected being sufficient to provide a weight ratio of net-free sulfur sufficient to complex cyanides, particularly weight-simple cyanides. In using the stabilized APS of the present invention, it is preferred to maintain the pH of the aqueous stream being treated at at least about 8, preferably in the range of from about 9 to about 11. As noted, the amount of stabilized APS added will be dependent upon the concentration of cyanides in the aqueous stream being treated, the concentration of the ammonium polysulfide in the APS solution and the degree to which it is desired to reduce the cyanides in the aqueous stream. Since the stabilized APS of the present invention substantially eliminates the problem of crystallization and precipitation of sulfur, it finds particular utility in treating aqueous streams or compositions that, for various reasons, albeit that they are present in or form a part of a process, exist in a substantially quiescent state, to a certain degree mimicking storage conditions to which the APS might be subjected. Since sulfur is not readily crystallized or precipitated from the stabilized APS compositions of the present invention, the likelihood that precipitated sulfur will foul pumps, lines and the like used in the process is greatly minimized.

To more fully illustrate the present invention, the following non-limiting examples are presented. In all cases, the APS used had a pH of from about 9 to about 13.

EXAMPLE 1

This example demonstrates how the loss of ammonia at ambient temperature or subjecting the APS to sub-ambient temperatures results in crystallization and precipitation of sulfur from the APS. In a first set of runs, five separate, 40-gram samples of APS were subjected to a nitrogen purge at a purge rate of 0.5 cc/min to obtain a desired weight loss, i.e., loss of ammonia. The five runs were compared with an APS that had not been nitrogen purged. The time of crystallization at ambient temperature was noted. In a second set of runs, six separate 40-gram samples of APS in sealed glass bottles, duplicating the six 40-gram samples of the first set of runs, were placed in a freezer and the time of crystallization noted. The results for both sets of runs are shown in Table 1 below.

TABLE 1

| % Weight Loss of Ammonia | % Weight Stabilizing Compound | Crystallization Time | |
|---|---|---|---|
| | | Ambient Temperature | Temperature 9° F. |
| 0 | 0 | >24 hours | 2–3 hours |
| 0.26 | 0 | <24 hours | 5–10 minutes |
| 0.52 | 0 | 14 hours | 5–10 minutes |
| 0.76 | 0 | 6 hours | 5–10 minutes |
| 1.0 | 0 | 6 hours | 5–10 minutes |
| 2.0 | 0 | 6 hours | 5–10 minutes |

As can be seen from the data in Table 1, loss of ammonia at ambient temperature, a condition that occurs frequently in the manufacture, transportation and storage of APS, results in crystallization, i.e., destabilization of the APS, in a relatively short period of time. Note, for example, that when the ammonia loss amounts to 0.26 weight percent, crystallization time falls from greater than 24 to less than 24 hours, and when the weight loss is above about 0.5% by weight, crystallization occurs in about 6 hours. With respect to the six runs at sub-ambient temperature, it can be seen that even without any loss of ammonia, the APS begins to crystallize in approximately 2–3 hours. However, with only a minor loss of ammonia, crystallization takes place in a very short period of time.

EXAMPLE 2

In this example, four different charges of 40 grams of APS were purged with nitrogen to achieve a 1% weight loss of ammonia. Varying amounts of morpholine were then added to the four samples and the crystallization times determined at ambient temperature and at 9° F. The results are shown in Table 2 below.

TABLE 2

| % Weight Loss | % Weight Stabilizing Compound (Morpholine) | Crystallization Time | |
|---|---|---|---|
| | | Ambient Temperature | Temperature 9° F. |
| 1.0 | 1.0 | 6 hours | 5–10 minutes |
| 1.0 | 2.0 | 6 hours | 5–10 minutes |
| 1.0 | 3.5 | 14 hours | 60 minutes |
| 1.0 | 5.0 | >24 hours | >24 hours |

As can be seen from the results in Table 2, when the level of morpholine is above about 3.0%, the crystallization time, both at ambient temperature and at 9° F., is greatly increased. Note particularly that at the 5% level, crystallization times, both at ambient temperature and 9° F., are greater than 24 hours.

EXAMPLE 3

In this example, samples of 80 grams of APS with and without stabilizing compounds at varying levels were placed into closed containers and then placed either into an ambient temperature bath or a freezer maintained at 9° F. Crystallization times of the various samples were determined. The results are shown in Table 3 below.

TABLE 3

| Stabilizing Compound | % Weight | Crystallization Time | |
|---|---|---|---|
| | | Ambient Temperature | Temperature 9° F. |
| none | 0 | 45 days | 2–3 hours |
| morpholine | 1 | 45 days | 2–3 hours |
| morpholine | 2 | 45 days | 2–3 hours |
| morpholine | 3 | 45 days | 2–3 hours |
| morpholine | 5 | >2.5 months | >45 days |
| morpholine | 10 | >2.5 months | >45 days |
| N-methylpyrrolidone | 1 | >45 days | 3 days |
| N-methylpyrrolidone | 3 | >45 days | 3 days |
| N-methylpyrrolidone | 5 | >45 days | 3 days |
| N-methylpyrrolidone | 10 | >45 days | >7 days |

As can be seen from the data in Table 3, with no ammonia loss morpholine is effective both at ambient temperature and at 9° F. at a level of above about 3% by weight. In the case of N-methylpyrrolidone (NMP) (up to a 5% by weight amount), satisfactory stabilization is exhibited at ambient temperature. However, at low temperatures (9° F.), that level of NMP is a less effective stabilizing compound. Note, however, that at the 10% by weight level, NMP is an effective stabilizer.

EXAMPLE 4

This example shows the results of testing the effectiveness of a wide variety of potential stabilizing compounds. In all cases, the procedure of Example 3 was followed with the exception that the stabilizing compounds were used at the 6% by weight level. The results are shown in Table 4 below.

TABLE 4

| Stabilizing Compound | Crystallization Time | |
|---|---|---|
| | Ambient Temperature | Temperature 9° F. |
| None | 45 days | 2–3 hours |
| dimethylcyclohexylamine | >90 days | 3 days |
| cyclohexylamine | <5 minutes | 15 minutes |
| triethanolamine | 4 days | 5 days |
| diethylhydroxylamine | 5 days | 3 days |
| Primene 81R[1] | 2 phases | 2 phases |
| p-phenylenediamine | 3 days | 2 phases |
| diphenylamine | insoluble | insoluble |

TABLE 4-continued

| Stabilizing Compound | Crystallization Time | |
|---|---|---|
| | Ambient Temperature | Temperature 9° F. |
| methoxypropylamine | >90 days | >78 days |

[1] A mixture of isomeric amines of the formula $(C_xH_{2x+2})_3CNH_2$, wherein x is 12–14, sold by Rohm & Haas.

As can be seen from the data in Table 4, with the exception of methoxypropylamine and dimethylcyclohexylamine, none of the compounds listed in Table 4 show any significant stabilizing effect either at ambient temperature or at a temperature of 9° F.

EXAMPLE 5

Using the procedure of Example 3, pyrrolidine and 2-pyrrolidinone are used as stabilizing compounds. Both compounds are found to be effective at ambient temperatures and at 9° F.

The foregoing description and examples illustrate selected embodiments of the present invention. In light thereof, variations and modifications will be suggested to one skilled in the art, all of which are in the spirit and purview of this invention.

What is claimed is:

1. A method of stabilizing aqueous ammonium polysulfide solutions comprising admixing with said ammonium polysulfide solution a stabilizing amount of a water soluble stabilizing compound selected from the group consisting of azacyclic compounds, compounds having the formula $R-O-C_nH_{2n}-NH_2$, wherein R is an alkyl group of from 1 to 3 carbon atoms and n is 1 to 3, compounds having the formula $(CH_3)_2NR_1$, wherein $R_1$ is a hydrocarbon group having from 1 to 6 carbon atoms and mixtures thereof, that are soluble in said ammonium polysulfide solution, the pH of said ammonium polysulfide solution being in the range of from 7 to 14.

2. The method of claim 1 wherein azacyclic compound comprises morpholine.

3. The method of claim 1 wherein said stabilizing compound is present in an amount of from about 3 to about 15% by weight.

4. The method of claim 1 wherein the pH of said ammonium polysulfide solution following the addition of said stabilizing compound is in the range of from about 8 to about 12.

5. A stabilized composition of ammonium polysulfide comprising an aqueous solution of ammonium polysulfide and a stabilizing amount of a water soluble, stabilizing compound selected from the group consisting of azacyclic compounds, compounds having the formula $R-O-C_nH_{2n}-NH_2$ wherein R is an alkyl group of from 1 to 3 carbon atoms and n is 1 to 3, compounds having the formula $(CH_3)_2NR_1$, wherein $R_1$ is a hydrocarbon group having from 1 to 6 carbon atoms and mixtures thereof, the pH of said composition being from 7 to 14.

6. The composition of claim 5 wherein said stabilizing compound comprises morpholine.

7. The composition of claim 5 wherein said stabilizing compound is present in an amount of from about 3 to about 15% by weight.

8. The composition of claim 5 wherein the pH of said composition is from about 8 to about 12.

9. A method of controlling the cyanide concentration in an aqueous stream comprising introducing into said aqueous stream an effective amount of a composition comprising an aqueous solution of ammonium polysulfide and a stabilizing amount of a water soluble, stabilizing compound selected from the group consisting of azacyclic compounds, compounds having the formula R—O—$C_nH_{2n}$—$NH_2$, wherein R is an alkyl group of from 1 to 3 carbon atoms and n is 1 to 3, compounds having the formula $(CH_3)_2NR_1$, wherein $R_1$ is a hydrocarbon group having from 1 to 6 carbon atoms and mixtures thereof, the pH of said composition being from 7 to 14.

10. The method of claim 9 wherein said stabilizer compound comprises morpholine.

11. The method of claim 9 wherein said concentration of said stabilizer compound is from about 3 to about 15% by weight.

* * * * *